Dec. 1, 1959     M. MENDELSOHN     2,915,579
SEPARATOR FOR ELECTRIC BATTERY
Filed Dec. 27, 1955

INVENTOR
MEYER MENDELSOHN

BY J. B. Burke
ATTORNEY

United States Patent Office 2,915,579
Patented Dec. 1, 1959

2,915,579

SEPARATOR FOR ELECTRIC BATTERY

Meyer Mendelsohn, New York, N.Y., assignor to Ions Exchange & Chemical Corp., New York, N.Y., a corporation of New York Application December 27, 1955, Serial No. 555,346

6 Claims. (Cl. 136—146)

The present invention relates to electric battery separators, and more particularly to separators for batteries wherein electrodes of opposite polarity are confined in a container under pressure and are prevented from contact with one another by the interposition of electrolyte-permeable separators. This application is a continuation-in-part of U.S. patent application Ser. No. 251,780, filed October 17, 1951, now matured into U.S. Patent No. 2,816,154.

The present invention has for its principal object to provide an improved coated structure for a battery separator.

It is a further object to provide means for more effectively protecting a semi-permeable separator membrane in an alkaline battery electrolyte so as to increase the number of charging and discharging cycles of the battery without objectionable augmentation of volume, weight or internal resistance, and without reducing the capability of the membrane to swell in the battery electrolyte.

It is a further object to provide a battery separator structure having a semi-permeable membrane coated with an electro-conductive protective film layer.

It is a further object to provide a battery with an improved separator structure.

It is a further object to provide a battery separator having a structure including a semi-permeable membrane swellable in an alkaline electrolyte and coated with electrolyte-permeable protective film layers containing an agent having selective binding properties for metal ions in the electrolyte.

A further object is to provide a battery separator comprising a semi-permeable membranous sheet coated with an elastomeric protective layer and containing a water-dispersible agent which is stable in an alkaline electrolyte and has selective cationic binding properties.

A further object is to provide a method of making a separator structure by coating a semi-permeable membrane with a medium including a selective binding agent for metal ions in an alkaline electrolyte.

A further object is to provide a battery including silver-zinc electrodes separated by membranous sheets in an alkaline electrolyte, with the sheets having protective coatings containing water-dispersible agents having selective binding properties for metal ions in the electrolyte.

A representative battery cell of the type referred to is one which includes a casing containing an electrode assembly immersed in an alkaline electrolyte such as an aqueous solution of potassium hydroxide. In the electrode assembly are positive electrodes containing in the charged condition silver oxide AgO and/or silver peroxide $Ag_2O_2$ and juxtaposed in alternation with negative electrodes containing zinc, with membranous separators, semi-permeable to the electrolyte, disposed between the several electrodes. The separators each comprise one or more layers of a semi-permeable membrane such as a sheet of regenerated cellulose (cellophane) which is swellable in the electrolyte and generates a compressive force between the electrodes in the electrode assembly. Such batteries operate generally satisfactorily if the separator is maintained under compression between the electrodes so as to prevent gradual dilation of its pores; nevertheless it has been found that in a rechargeable battery of this type the number of charging cycles which the battery may undergo is limited by the eventual deterioration of the membranous separator. Investigations have indicated that the separator material is subject to a chemical attack by the active material of the adjacent electrodes. Contact with the silver peroxide of the positive electrode causes decomposition of the cellophane separator by oxidation.

The weakened separator is readily penetrated by metal growths formed on the negative electrode. Such penetration of the separator by metal ions and metal growths causes short circuits which reduce the energy output and shorten the active life of the battery. It has been found that the silver oxide and the silver peroxide have a limited solubility in the alkaline electrolyte so that silver ions are released therein. The silver ions react with the unprotected cellophane separator sheets in the alkaline solution. This reaction is believed to involve the rupture of the glucosidic linkages joining the glucose units of the polymeric cellulosic chain. As a result of this reaction the sheet material is decomposed to a powder.

Heretofore the difficulties described have been met by increasing the number of cellophane layers in the separators. Another expedient has been the interposition of porous bibulous materials as interseparators between the electrodes and the separator membranes. These porous interseparators physically separate the electrodes from the cellophane membranes.

These expedients have been only partially effective. Also they cause a substantial increase in the thickness of the separator material and reduce the number of silver-zinc electrode assemblies which may be placed in a casing of given size, so that the electric storage capacity and output of a battery of given size is reduced. Furthermore, they increase to a considerable extent the weight and the internal resistance of the battery so that total energy output is reduced.

It has been found according to the invention that the semi-permeable membrane separator may be protected from the difficulties heretofore encountered by bonding thereto suitable protective films or coatings. It has been observed that the deterioration of the separator material when immersed in the alkaline electrolyte used in the battery occurs in the presence of silver ions while the cellophane is unaffected by the alkaline electrolyte when silver ions are withheld therefrom. The coating material thus has as a principal function the protection of the cellophane or other swellable separator material from the action of the silver ions. The coating on the cellophane acts as a barrier to the migration of the silver ions and, in fact, acts as a binder to restrain the silver ions from further movement. This action does not interfere with the operation of the battery cell because the coating permits the transfer of potassium ions, hydroxyl ions, and other ions through the separator to complete the electrochemical process during charge and discharge of the battery. The silver ions which are not required to be transferred through the separator in the operation of the battery are effectively barred by the protective films. Thus the protective films act, in effect, as selective ion-exchange media to permit transfer of water as well as potassium, hydroxyl and other ions therethrough while barring passage of silver ions from the positive electrodes to the swellable separator material.

According to the invention a separator is formed from a membranous sheet of cellophane or some other material semipermeable to and swellable in an alkaline electrolyte and coated on one or both sides with a film of an alkaliand oxidation-resistant film containing a selective cation-binding agent. The membranous sheet is preferably about .001 inch thick and the film layer has a lesser thickness which may be as little as .0002 inch. The lesser thickness is preferable in order to minimize the electric resistance of the separator and also to permit passage of water through the film layers to saturate and swell the membranous sheet. The film layers must be of such nature as to adhere to the membranous sheet even when in a saturated and swollen condition and they must be elastomeric to stretch with the membranous sheet during immersion in the alkaline electrolyte. The film layers contain a dispersion of a selective catonic binding agent in very finely divided form. The agent while having inherently low electrical conductivity nevertheless reduces the resistivity of the separator in an alkaline electrolyte to about 50 ohm-cm. It has the property of binding positively charged heavy-metal ions, such as silver ions without preventing the passage of water, potassium ions, hydroxyl ions, and other ions present in the alkaline electrolyte solution. It is compatible with the coating material to form therewith a thin, homogeneous, elastic, protective semipermeable film which is bonded to and expands with the membranous sheet in its electrolyte-saturated condition. The bond of the protective film to the membranous sheet persists in the alkaline electrolyte even if the membranous sheet swells to a gel-like consistency.

The invention will be best understood with reference to the drawing, wherein.

Figure 1:
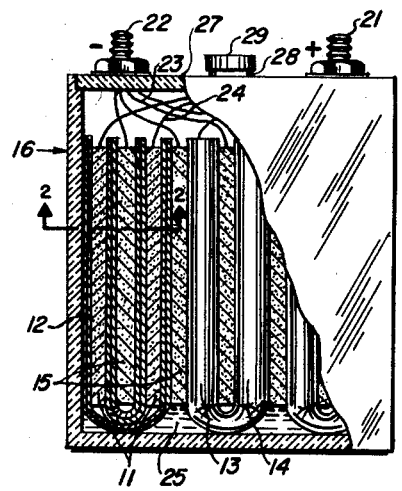
Fig. 1 is an elevational view, partly in section, of a battery embodying the invention.
Figure 2:
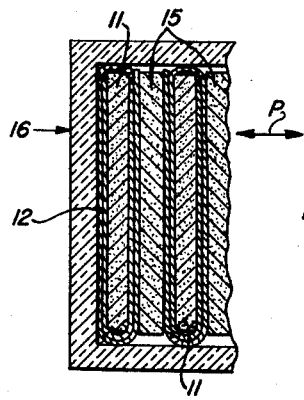
Fig. 2 is a sectional view taken on line 2—2 of Fig. 1.

In Figs. 1, 2 a battery according to the invention is diagrammatically shown. The battery comprises a number of positive electrodes 11, which may be of silver oxide, each wrapped in a plurality of turns or folds of a separator sheet 12. The sheet forms an envelope which is bent in the form of a U at the bottom and has two upstanding arms 13 and 14. One electrode 11 is disposed in each arm of the U. Between the arms of the U and between the U's are inserted the negative electrodes 15 which may be of zinc. The electrode assembly is contained in casing 16 and is impregnated with an alkaline electrolyte 25, such as an aqueous solution of potassium hydroxide, adapted to exert a swelling and dilating effect on the separator material. The electrodes are connected by leads 23 and 24 to positive terminal 21 and negative terminal 22 respectively. The terminals are mounted in the cover 27 which also has a vent 28 and a vent cap 29.

In Fig. 2 the relationship of a pair of negative electrodes 15 and a positive electrode 11 to the surrounding arms of envelope 12 is shown by a transverse cross section through these elements taken on line 2—2 of Fig. 1. The positive electrode 11 comprises an electropositive material which may be silver and/or silver oxide. The positive electrode is shown wrapped in a plurality of layers of the separator material and the electrodes occupy all available space in the casing in the direction perpendicular to their plane faces. A compressive force is exerted in the direction of arrow P by reason of the swelled condition of the separator material.

Figure 3:
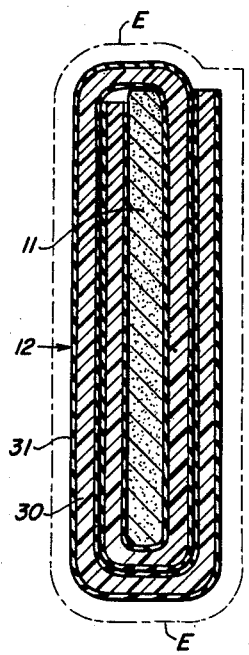
Fig. 3 is a plan sectional view of an electrode enclosed in an envelope of a separator sheet according to the invention.

In Fig. 3 there is indicated by dotted lines E the manner in which the folded or wound separator sheet 12 expands when saturated with the electrolyte liquor. The sheet 12 as clearly shown in Fig. 3, contains a base membrane 30. The membrane is a viscose material which is semipermeable to the electrolyte. The material may be cellophane (regenerated cellulose), or some other semipermeable material which is swellable in the electrolyte in order to develop the pressure mentioned above, while maintaining its permeability to the electrolyte, so that the electrodes may be freely irrigated by the electrolyte in the battery. The thickness of film 30 need not be more than .001 inch. A minimum thickness is desirable in order to obtain minimum volume in the electrode assembly. The protective film layers 31 are firmly bonded to both sides of membrane 30 in the alkaline electrolyte. These layers are composed of film-forming material which is elastomeric in the alkaline electrolyte and is capable of stretching along with the membrane 30 when it expands in the electrolyte to line E. It is essential that these layers be sufficiently thick to protect the membrane 30 adequately from oxidation and chemical attack in the electrolyte. The layers 31 must not be too thick because it is necessary that they be permeable to the electrolyte which must enter the membrane 30 to dilate it. The layers 31 must also permit free passage of mobile ions during the electrochemical action of the battery on charge and discharge. It is desirable that the layers 31 have a minimal thickness substantially less than that of membrane 30 in order to reduce the volume of the electrolyte assembly. Film thicknesses in the range of .001 to .0005 inch have been found suitable for the layers 31; one material which has been found suitable for the film layers is polystyrene butadiene latex.

It has been found necessary to provide means for reducing the electrical resistance of the film layer 31 to a minimum amount. This has been done according to the invention by permeating layer 31 with a water-dispersible material which acts as a resistance-lowering agent in the alkaline electrolyte, and by minimizing the thickness of the film layer 31 to reduce the resistivity of the entire separator sheet structure from about 5000 ohm-cm. to about 50 ohm-cm. Inclusion of this material in the layer 31 imparts useful selective ion-exchanging properties to the layer 31 in a battery separator as above disclosed. This material has been found to provide an excellent barrier to migration of certain positively charged metal ions which may be present in the liquid electrolyte. If the migration of these ions through the permeable separators to the electrodes of opposite plurality is not prevented, short circuits and other troublesome effects in the battery result.

Figure 5:
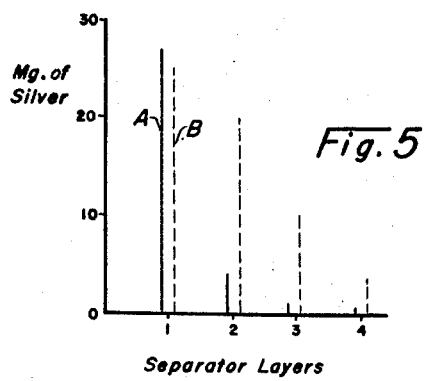
Fig. 5 is a chart useful in explaining the invention.

Fig. 5 shows graphically the extent to which separators having protective film coating thereon as herein disclosed serve as selective barriers to migrating ions in a battery as shown in Fig. 1. Solid lines A represent the silver content in each layer of a battery separator sheet after twenty cycles of charge and discharge of the battery, wherein the cellophane membranes have a protective coating according to the invention on each side thereof and are wound in a plurality of turns about the positive electrode as shown in Fig. 3. Dotted lines B represent the silver content in each layer of a battery separator according to the prior art after twenty cycles of charge and discharge of the battery, this separator consisting of a similar cellophane sheet but without a protective film on either surface. It will be noted as shown by solid lines A that the first separator layer nearest to the positive electrode, having a protective film coating thereon, binds a maximum quantity of silver and that substantially no silver ions penetrate through to the second and subsequent layers. The prior art separator having no protective film coating thereon contains silver in each layer thereof in substantial amounts, as shown by dotted lines B. The cellophane in these expansible separator layers is decomposed wherever the silver is present and the decomposition is substantially proportional to the amount of silver present therein. The distribution of silver is less in each succeeding separator layer represented by dotted lines B, but each layer shows a considerable penetration by and decomposition due to the migrated silver.

Figure 4:
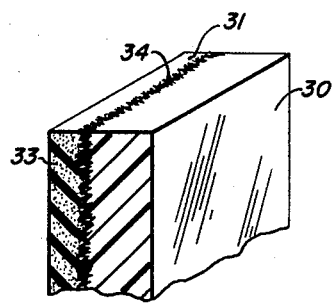
Fig. 4 is a fragmentary perspective view, on an enlarged scale, of a separator sheet having a protective film layer on a membranous sheet.

In Fig. 4 the separator has a single film coating 31 on the membranous sheet 30. The envelope for the electrode 11 may be formed by folding or winding the separator sheet around it in the same manner as shown for the separator in Fig. 3. This separator should be wound around the electrode 11 twice as many times as the separator 12 in order to provide the same barrier effect for silver ions in the battery. The separator with a single film coating is used when a structure is desired which is more readily wetted in an alkaline solution than is the separator with two protective film coatings.

The film 31 forms a strong mechanical bond with the membranous sheet 30 as indicated in Fig. 4 where the lateral surface region 34 of the sheet has been entered to a limited extent by the coating material. This bond remains intact during immersion and swelling of the separator in the alkaline electrolyte. The bond may be dissolved by immersing the coated sheet in a neutral or acid aqueous solution. In such a solution the coating with its suspended particulate content is wholly washable from the membranous sheet to leave it completely clear. The coated separator sheet may be stored in a dry state indefinitely before use.

The film coatings 31 applied to the membranous sheet 30 fulfill several important functions. The films are sufficiently flexible to remain intact without splitting when the coated separator 12 is folded and stretched around the electrodes. The films expand with the membranous sheet when it swells in the electrolyte. The films adhere to the membranous sheet when it is in a dilated condition, i.e. saturated with the electrolyte. The films 31 are semipermeable to the electrolyte to permit passage of the electrolyte therethrough to and through the membranous sheet. The films are stable and remain elastomeric and resistant to chemical attack in the strong alkaline electrolyte. The films retain the dispersed ion-binding particles in a uniformly distributed suspension.

A suitable film-forming material for the coatings 31 is polystyrene butadiene latex. A very thin flexible film of methacrylate latex may also be used. Certain film-forming materials are not satisfactory because they either do not form low-resistivity films, or cannot be formed into sufficiently thin coatings, or are brittle and inflexible, or are soluble in an alkaline electrolyte. Such materials are polyvinyl chloride, phenol-aldehyde resins, and polystyrene-divinyl-benzene films. The satisfactory films are all: resistant to oxidation and alkali; formable into a thin film of low electrical resistance; strongly adherent to the semipermeable base sheet even while it is saturated with electrolyte liquor and in an expanded condition; elastic in the electrolyte to expand with the base membranous sheet; flexible in the dry state to be folded and stretched around a thin metal electrode without cracking or peeling, and stable in a dry state to permit storage for extended periods before use.

The material 33 dispersed in the film 31 is very finely divided. It is chemically stable and compatible with the film to permit formation of a homogeneous adherent and uniform low-electrical-resistance film. The dispersed material is insoluble in the potassium-hydroxide electrolyte so that it does not leach out when the coated separator is immersed in the electrolyte. The material securely binds electropositive heavy-metal ions while permitting passage of water and ions active in the electrochemical action of the battery. The dispersed material may be described as constituting a selective cationic binding agent or as a binding agent for certain electropositive metal ions.

The dispersed material lowers the resistivity of the coated sheets 12, each of about .001 to .002 inch in thickness, to about 0.025 ohm × inches² (corresponding to a specific resistivity of about 50 ohm-cm.). This dispersed material appears selectively to react with ions such as the cationic silver ions to form a stable compound therewith. While various materials may be used as the selective metal-ion-binding agent, a preferred material is a linear polymer including a polystyrene chain whose benzene rings have incorporated therein water-avid polar groups such as COOH—, $HSO_3$—, etc. One particularly desirable material is a water-dispersible polystyrene resin containing at least one carboxy group per benzene ring and having a molecular weight low enough to form a stable aqueous suspension thereof. This molecular weight may be between 500 and 2000. The preferred material may be represented by the following structural formula:

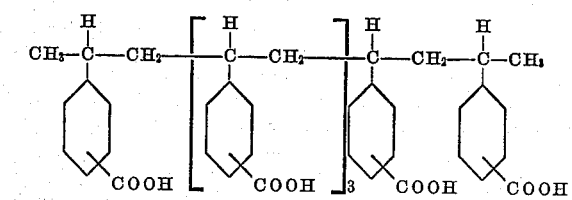

In this molecule the hydroxyl group is acidic and the hydrogen of the group is probably replaced by alkali cations (such as positively charged potassium ions) in the alkaline electrolyte until metal cations (such as positively charged silver ions) are available, whereupon the alkali ions are presumably set free and are replaced by the silver ions, which become permanently bound to the molecule.

Another usable selective cationic binding agent is a sulfonated polystyrene which forms a stable compound with silver by the reaction:

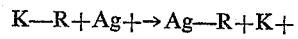

wherein R is the anionic form of the ion-binding agent; K+ and Ag+ represent potassium and silver ions respectively.

Naturally occurring cationic exchange materials such as bentonite are also usable as the metal-ion-binding agent insofar as they are made compatible, e.g. by fine grinding and incorporation, with the material which forms the continuous film bonded to the swellable separator material.

The use of polar-group-containing material in a form which is soluble or dispersible in the film-forming material allows production of a more homogeneous, thinner (and therefore of lower electrical resistance) protective film than is possible with use of polar-group-containing material which is granular, inasmuch as such granules necessitate a film of a thickness at least as great as the largest granule. Brittle sulfonate-polystyrene resins, for instance, may be ground, with difficulty, to .0002-inch size (5 microns), but even this small particle size necessitates a film-forming material having a thickness at least equal to the particle size so that the total thickness of the protective film will be about .0005 inch or about one half that of the protected membrane. For a membrane 30 having two film coatings 31, the total thickness of the protective films will be about the same as that of the membrane, which results in a structure having the highest tolerable electrical resistance. In general, the combined thicknesses of the protective films should be considerably less than that of the covered membrane.

A separator sheet as disclosed above may be formed as described in the following:

*Example*

To 500 cc. of $H_2O$ at 90° C. are added 150 grams of a water-dispersible carboxylated polystyrene resin. This resin should have a sufficient substitution of carboxyl groups in the benzene ring to form a relatively stable water-dispersible polyelectrolyte. The molecular weight of the resin should be such that it has a softening point of about 180° C., and it should have one carboxyl group per benzene ring. Scriptite 50 is a trade name for such a resin that may be used for this purpose. The dispersed resin and water are stirred until the mixture swells, and stirring is continued until the swelling ceases and a stable sol develops. About 3 cc. of a nonfoaming detergent such as an alkyl aryl sulfonate, having a formula $$C_{12}H_{25}(C_6H_4)SO_3Na$$

are added to the sol previously obtained. The detergent is thoroughly mixed in the sol until a uniform sol results. About 500 cc. of water are added to this uniform sol. About 200 grams of this diluted sol are added to 50 grams of a water emulsion of polystyrene butadiene latex containing 60% water, 40% solids. This product is mixed to disperse the resin thoroughly in the latex. The resulting liquid is a film-forming product which may now be coated on a cellophane or other semipermeable membrane of about .001-inch thickness by dipping, spraying, or transfer application. After the membraneous sheet is coated on one or both sides, it is dried in air at room temperature or in a warm oven. The resulting coated separator sheet will be found to be stable in an aqueous alkaline electrolyte of 44% KOH even though the coatings will deteriorate in acid or neutral water solution.

Batteries containing separators of the improved type herein disclosed are observed to be chargeable in a shorter time than batteries using unprotected membranous separators. The batteries also have a longer active life under repeated cycles of charge and discharge.

The protective film 31 serves as an adherent coating on the expansible bibulous cellophane separator material 30 which is subject to decomposition in the battery electrolyte 25. This quality of adherence between film and expansible material is present when the expansible material expands in the battery electrolyte as shown in Figs. 1 and 2 to as much as two to three times its original volume.

What is claimed is:

1. A separator for an alkaline battery, comprising a semi-permeable sheet swellable in an alkaline medium and a coating of elastomeric material on said sheet, said material being elastic at normal temperatures, said coating incorporating a water-dispersible, alkali-resistant cation-exchange resin uniformly distributed therethrough.

2. A separator according to claim 1, wherein said coating has a thickness substantially less than the thickness of said sheet.

3. A separator according to claim 1, wherein said resin is a modified polystyrene having a hydrophilic polar group attached to each benzene ring.

4. A separator according to claim 3, wherein said hydrophilic group is a carboxyl group.

5. A separator for alkaline batteries, comprising a sheet of regenerated cellulose and an elastomeric coating on said sheet, said coating having uniformly distributed therethrough a carboxylated polystyrene of molecular weight ranging between substantially 500 and 2,000.

6. A separator according to claim 5, wherein said coating comprises a film of polystyrene butadiene latex.

References Cited in the file of this patent

UNITED STATES PATENTS

| | | |
|---|---|---|
| 2,181,299 | Burgess | Nov. 28, 1939 |
| 2,610,219 | Yardeny | Sept. 9, 1952 |
| 2,653,985 | Philipps | Sept. 29, 1953 |
| 2,653,986 | Philipps | Sept. 29, 1953 |
| 2,655,552 | Fuller et al. | Oct. 13, 1953 |
| 2,696,515 | Koren et al. | Dec. 7, 1954 |
| 2,816,154 | Mendelsohn | Dec. 10, 1957 |